United States Patent

Hutchens et al.

[11] Patent Number: 5,542,681
[45] Date of Patent: *Aug. 6, 1996

[54] GRAPHITE PACKING

[75] Inventors: Wilbur D. Hutchens; Virgil W. Pepper; Frank E. Jensen, all of Marshalltown, Iowa

[73] Assignee: Fisher Controls International, Inc., Clayton, Mo.

[*] Notice: The term of this patent shall not extend beyond the expiration date of Pat. No. 5,299,812.

[21] Appl. No.: 583,270

[22] Filed: Jan. 5, 1996

Related U.S. Application Data

[60] Continuation of Ser. No. 207,775, Mar. 8, 1994, abandoned, which is a division of Ser. No. 991,086, Dec. 15, 1992, Pat. No. 5,299,812, which is a continuation of Ser. No. 791,431, Nov. 13, 1991, abandoned, which is a continuation-in-part of Ser. No. 632,097, Dec. 21, 1990, abandoned.

[51] Int. Cl.$^6$ ..................................................... F16J 15/00
[52] U.S. Cl. ........................... 277/106; 277/105; 277/123
[58] Field of Search .................................. 277/106, 123, 277/124, 125; 271/102, 105, 143, 227, 233

[56] References Cited

U.S. PATENT DOCUMENTS

| | | | |
|---|---|---|---|
| 1,417,877 | 5/1922 | Wright. | |
| 1,594,517 | 8/1926 | Dufty. | |
| 2,567,479 | 9/1951 | Hebard | 286/16 |
| 3,316,940 | 5/1967 | Gratzmuller | 277/125 |
| 4,352,499 | 10/1982 | Foster | 277/125 |
| 4,363,463 | 12/1982 | Moon, Jr. | 277/125 |
| 4,394,023 | 7/1983 | Hinojosa | 277/125 |
| 4,408,769 | 10/1983 | Wolff | 277/105 |
| 4,438,957 | 3/1984 | Williams et al. | 277/125 |
| 4,451,047 | 5/1984 | Herd et al. | 277/102 |
| 4,577,872 | 3/1986 | Bake et al. | 277/125 |
| 4,630,636 | 12/1986 | Cutcher | 137/315 |
| 4,635,945 | 1/1987 | Beck | 277/124 |
| 4,720,113 | 1/1988 | Hertz, Jr. | 277/165 |
| 4,722,507 | 2/1988 | Lindackers et al. | 251/80 |
| 4,811,959 | 3/1989 | Bullard et al. | 277/124 |
| 4,826,181 | 5/1989 | Howard | 277/125 |
| 4,886,241 | 12/1989 | Davis et al. | 251/214 |
| 4,892,320 | 1/1990 | Tuckmantel | 277/125 |
| 4,961,991 | 10/1990 | Howard | 428/246 |
| 5,198,063 | 3/1993 | Howard | 156/282 |
| 5,299,812 | 4/1994 | Brestel et al. | 277/102 |

FOREIGN PATENT DOCUMENTS

| | | |
|---|---|---|
| 497875 | 12/1976 | Australia. |
| 526373 | 1/1980 | Australia. |
| 0027535A1 | 9/1980 | European Pat. Off.. |
| 0060238A1 | 9/1982 | European Pat. Off.. |
| 0187896A2 | 7/1986 | European Pat. Off.. |
| 57-173665 | 10/1982 | Japan. |

OTHER PUBLICATIONS

Ucar Carbon Company Inc., *Technical Bulletin No. 142* ©1991, no author available.
Ucar Carbon Company Inc., *Technical Bulletin No. 142A* ©1991, no author available.
Ucar Company Inc., *Newsletter No. 143* ©1991, no author available.
Fisher Controls, "Packing for Sliding Stem Valves", Bulletin 59.1:060, Apr. 1990, no author available.
DuPont Product Information, "Teflon PTFE 30" author and date not available.

*Primary Examiner*—Daniel G. DePumpo
*Attorney, Agent, or Firm*—Marshall, O'Toole, Gerstein, Murray & Borun

[57] ABSTRACT

A fluid valve graphite packing assembly with graphite packing rings and thin PTFE disc rings surrounding an operating valve member. Softer graphite packing rings on the interior are bounded by progressively harder graphite packing rings. A PTFE disc ring is inserted between the graphite packing rings. The packing is subjected to sufficient packing stress to cause the PTFE disc rings to extrude onto the operating valve member. A laminated packing ring formed of alternating sheets of flexible graphite and PTFE which is die cut to provide a crown shaped cross-section aiding in enabling PTFE extrusion to enhance valve operating member lubrication and sealing.

6 Claims, 2 Drawing Sheets

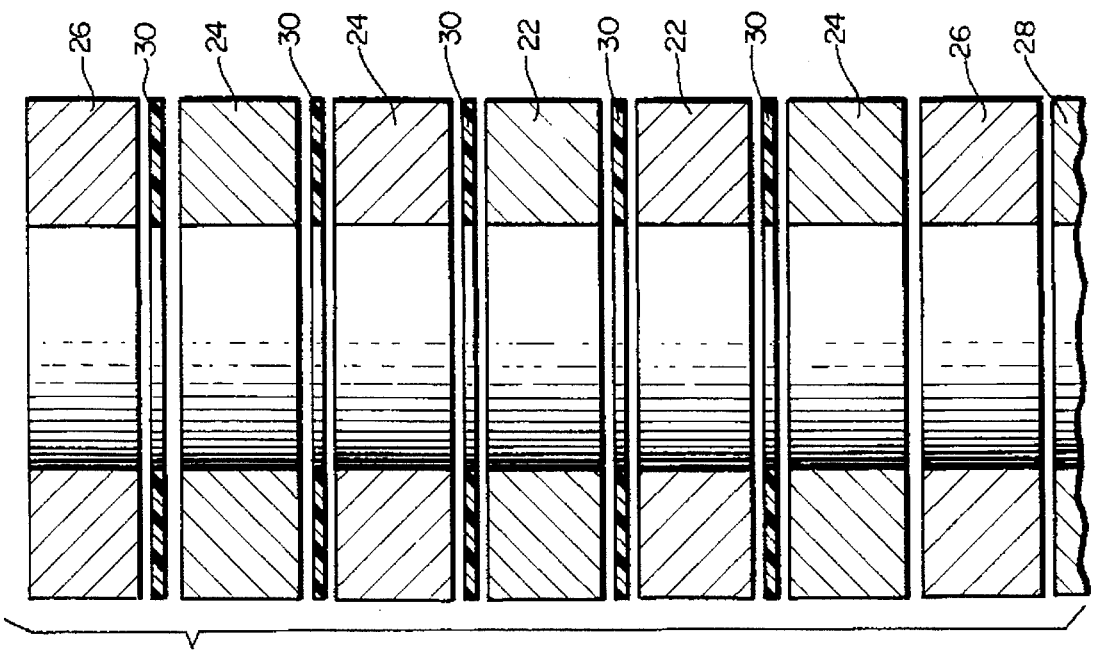
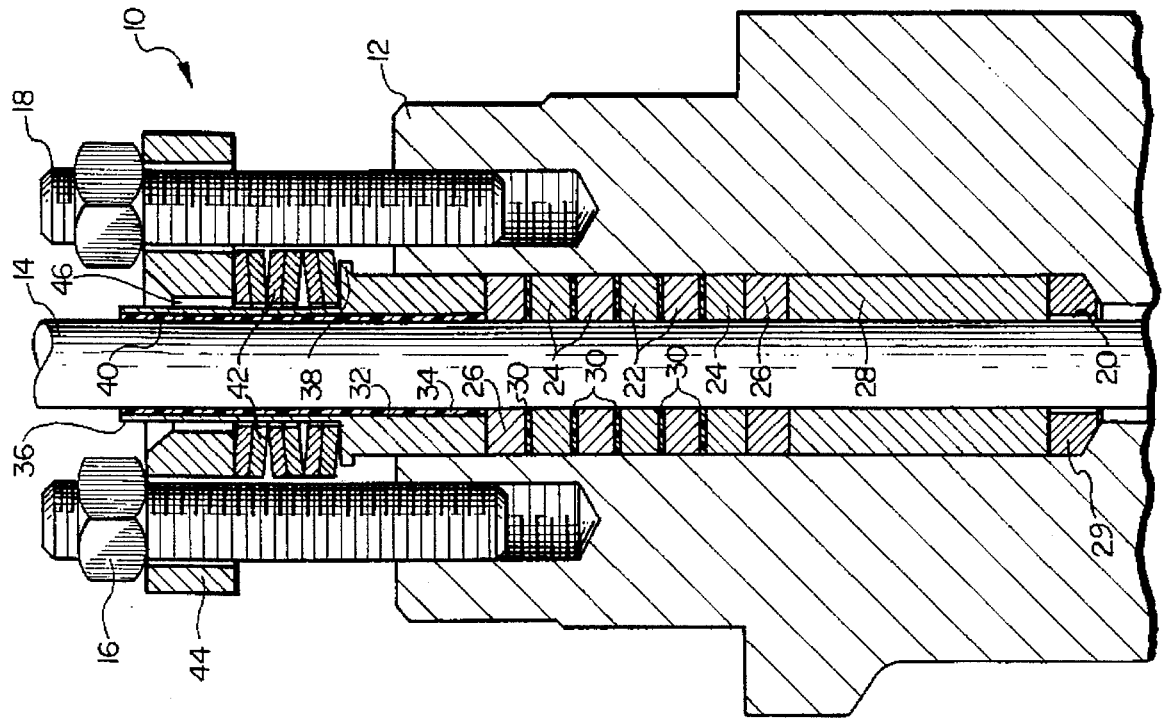
FIG. 2
FIG. 1

GRAPHITE PACKING

This is a continuation of U.S. application Ser. No. 08/207,775, filed Mar. 8, 1994, now abandoned, which is a Divisional of U.S. Ser. No. 07/991,086, filed Dec. 15, 1992, now U.S. Pat. No. 5,299,812, which is a Continuation of U.S. Ser. No. 07/791,431, filed Nov. 13, 1991, now abandoned, which is a Continuation-in-Part of U.S. Ser. No. 07/632,097, filed Dec. 21, 1990, now abandoned.

This invention relates to valve structures used in controlling the flow of fluids, and in particular to an improved packing particularly useful in meeting very stringent fluid leakage restrictions and in environments where the prevention of catastrophic leakage of the valve structure is desired.

BACKGROUND OF THE INVENTION

Packing materials are widely used to prevent fluid leakage around an operating member in a housing with fluid, such as a rotary shaft or a sliding stem in fluid control valves or in a reciprocating pump shaft. Normally such packing is formed of a resilient member and is placed under a static load by being bolted into position within a packing box around the operating member. In other instances the packing is subjected to spring loading in what is known as a live loaded packing configuration. Live loaded packing is particularly useful in attempting to prevent leakage of undesired fluids into the environment. Also, at operating temperature conditions of around 450° F. (232° C.) (i.e., operating temperature in the packing area) it is desired to use commonly available graphite packing rather than packing material formed of polytetrafluorethylene (PTFE) because PTFE packing tends to extrude at such elevated temperatures which could lead to packing failure and fluid leakage.

As an example, certain applications of a fluid control valve require not only that the valve meet stringent leakage requirements but that it also meet a stringent fire retarding test to prevent catastrophic packing failure. Fluid control valves in pipelines at refineries, and in other chemical processing applications are desired to have substantially zero leakage (i.e., less than 500 ppm) of fluid around the top of the valve, and to meet fire retarding tests as an equipment safety factor.

In such applications, graphite packing alone is not suitable. Attempts to increase the loading on the graphite packing provides a slight reduction in leakage but leads to extrusion of the graphite along the sliding stem or rotary shaft operating member, thereby causing increased friction and undue limitations in the useful valve life or valve stem/shaft travel. To reduce the leakage, it is desired to use PTFE packing material which can provide a better seal than graphite material. However, the use of PTFE packing at elevated packing temperatures is normally not recommended, and particularly where the valve must meet fire retarding tests, as in refinery applications, the extrusion and potential breakdown and vaporization of PTFE packing under high temperature fire conditions would lead to catastrophic packing failure and undesired hazardous fluid leakage.

SUMMARY OF THE INVENTION

In accordance with the principles of the present invention, there is provided an improved packing for sealing an operating member in a housing with fluid, such as in a sliding stem valve, rotary shaft valve, or reciprocating pump shaft. Thin, PTFE discs are inserted between the graphite packing rings of the packing system. The graphite packing is maintained at a stress level that is high enough to readily cause the PTFE discs to extrude inward against the operating member so that the PTFE material will lubricate the operating member in movements through the packing. The improved packing in accordance with the present invention significantly reduces leakage so as to meet the most stringent presently known leakage requirements of less than 500 ppm leakage concentration. In addition, the controlled, deliberate extrusion of the PTFE discs lubricates the operating member and leads to increased valve life.

In a constructed embodiment of the invention, a sliding stem valve incorporates live loading in the form of Belleville springs mounted around the shaft. The packing comprises four separate types of packing members maintained in the packing box and around the sliding stem.

The first and inner most packing members comprise a pair of die formed ribbon flexible graphite rings of a conventional type. On either side of the flexible graphite rings there is provided the second packing member comprising a graphite composite packing end ring which is slightly harder than the flexible graphite ring material. Such composite end rings are disclosed in U.S. Pat. No. 4,826,181, assigned to Union Carbide Corporation of Danbury, Conn.

The third packing member in the packing system comprises carbon bushing end rings adjacent the composite packing end ring on either side of the packing system. The fourth packing member comprises a plurality of PTFE discs with a respective PTFE disc located between certain of the aforementioned packing member rings in the packing box. Accordingly, the improved graphite packing system of the present invention includes relatively softer packing material rings encapsulated by somewhat harder packing material rings, which in turn is encapsulated by still harder packing material rings and with thin PTFE discs located between certain of the packing material rings.

As an example, a sliding stem valve embodiment of the invention included two ribbon graphite seal rings; a graphite composite packing end ring on one side and two composite end rings on the other side; a short carbon bushing on opposite sides and a long carbon bushing on one side; and seven PTFE discs each about 0.015 inch (0.381 mm) in thickness and a respective PTFE disc placed between each of the aforementioned packing members on a ½ inch (12.7 mm) diameter sliding stem shaft. The packing was subjected to a live loaded packing stress of 6,000 psi (41369 kPa) and 56,000 cycles of operation at ambient temperature over thirteen days of deriving test data (elapsed time for the test was twenty-five days). In this leak rate test, no bubbles of leaking fluid were observed during three minute observations during the first three test data days and an insignificant amount of bubbles were observed during the next four test data days.

In a preferred embodiment of the invention only five PTFE discs were used with the same graphite packing rings and carbon bushings and sliding stem diameter as the above described embodiment. A respective PTFE disc was inserted between each of the graphite packing rings and between the upper most ring and the short carbon bushing at the packing top. The packing was subjected to a live loaded packing stress of 5,000 psi (34474 kPa). Over 430,000 cycles of operation were run at temperatures between 400°–450° F. (204°–232° C.) with weekend shutdowns and resulting thermal cycles during ninety-two test data days. The elapsed time for the test was one hundred fifty-five days. No bubbles of leaking fluid were observed during three minute observations during the first seventy-two test data days.

In a constructed rotary shaft valve embodiment of the invention, live loading was provided in the form of Belleville springs mounted around the rotating shaft. The packing comprises a laminated ring sandwiched between a pair of anti-extrusion containment rings.

The laminated ring includes a flexible graphite sheet material laminated with PTFE sheet material and die cutting the lamination to form a laminated ring having a crown shape cross-section. It has been found that the crown shape cross-section enables the axial load from the packing follower to flatten the laminated ring so as to provide a radial force on the shaft and the packing box bore sufficient to desirably, controllably extrude some PTFE material onto the shaft and bore thereby lubricating the valve and leading to increased valve life. This effective transfer of the axial gland load to radially sealing force is accomplished by making the width of the packing cross section greater than the cross section of the packing box.

On either side of the composite laminated ring there is provided an anti-extrusion containment ring comprising a carbon bushing end ring. Preferably, these end rings are formed as zero clearance anti-extrusion rings having a slight interference fit with the shaft and split as disclosed in a U.S. Pat. No. 5,131,666, assigned to the same assignee as herein. Alternatively, the anti-extrusion end rings may be formed of PEEK material, and in addition a pair of graphite composite packing end rings may be used on each side of the laminated packing ring with the carbon bushing or PEEK end rings completing each end of the packing system.

As an example, a constructed rotary shaft valve embodiment of the invention included a laminated ring formed with six sheets of flexible graphite sheet material sandwiching a sheet of PTFE material between each flexible graphite sheet, and a zero-clearance carbon bushing on opposite sides of the laminated ring, all mounted on a 1.0 inch (25.4 mm) diameter rotating shaft. The laminated ring was formed of 0.030 inch (0.762 mm) thick flexible graphite sheet material alternating with 0.005 inch (0.127 mm) thick PTFE sheet material. The laminations were die cut so that at the base of the die the bottommost graphite ring was formed with a crown having a radius of about 0.16 inch (4.06 mm) and with the crown radius being reduced substantially towards the top of the die so that the topmost layer of flexible graphite ring was substantially flat or contained a very significantly reduced crown radius compared to the bottom layer. The composite ring measured 0.236 inch (5.99 mm) in thickness with an inside diameter of 1.0 inch (25.4 mm) and an outside diameter of 1.375 inch (34.9 mm).

To allow the wider packing material to be easily installed the die cut packing rings are formed with a crown shape so that the arc length of the packing cross section is approximately 0.015 inch (0.381 mm) longer than the width of the packing box cross section. The crown shape allows this ring to drop easily into the packing box. When the axial gland load is applied the crown shape is flattened, forcing the packing material to apply the radially sealing force against the stem and wall of the packing box.

The constructed valve with this improved packing was subjected to a test pressure of 1230 psi (8481 kPa) and 25,000 cycles of operation and four thermal cycles from ambient temperature to 450° F. (232° C.) over five days of deriving test data (elapsed time for the test was seven days). In this leak rate test, no bubbles of leaking fluid were observed during five minute observations during the five test data days.

The constructed valve next was subjected to a test pressure of 1100 psi (7585 kPa) and about an additional 20,000 cycles of operation and four thermal cycles from ambient temperature to 600° F. (316° C.) over four days of deriving test data (elapsed time for the test was seven days). In this leak rate test, virtually no bubbles of leaking fluid were observed during five minute observations during the four test data days.

The same laminated ring design may be used without the crown shape by controlling the fit of the ring with the shaft and packing box bore. However, the axial loading required to achieve the same radial force to desirably extrude PTFE material may be greater. Also, rather than forming a laminated ring, individual rings formed of flexible graphite sheet material and PTFE sheet material can be utilized. However, for assembly convenience, the laminated ring configuration is desired to enable ready emplacement of the integral laminated ring structure rather than attempting to positionably assemble several very thin, individual rings of flexible graphite and PTFE sheet material in alternating layers on the shaft and in the packing box. In addition, the die formed packing rings could have a wave spring shape. This would allow the packing material to apply the radially sealing force against the stem and wall of the packing box when the axial load is applied to flatten out the packing ring. Thus, the present invention provides a packing system which can meet stringent fluid leakage requirements and fire retardation requirements which are found necessary in many environmental applications.

BRIEF DESCRIPTION OF DRAWINGS

The features of this invention which are believed to be novel are set forth with particularity in the appended claims. The invention may be best understood by reference to the following description taken in conjunction with the accompanying drawings in which like reference numerals identify like elements in the several figures and in which:

FIG. 1 is a fragmented cross-sectional view illustrating a preferred embodiment of the improved packing of the present invention in a sliding stem valve;

FIG. 2 is an exploded view of the improved packing of FIG. 1;

DETAILED DESCRIPTION

Figure 4:
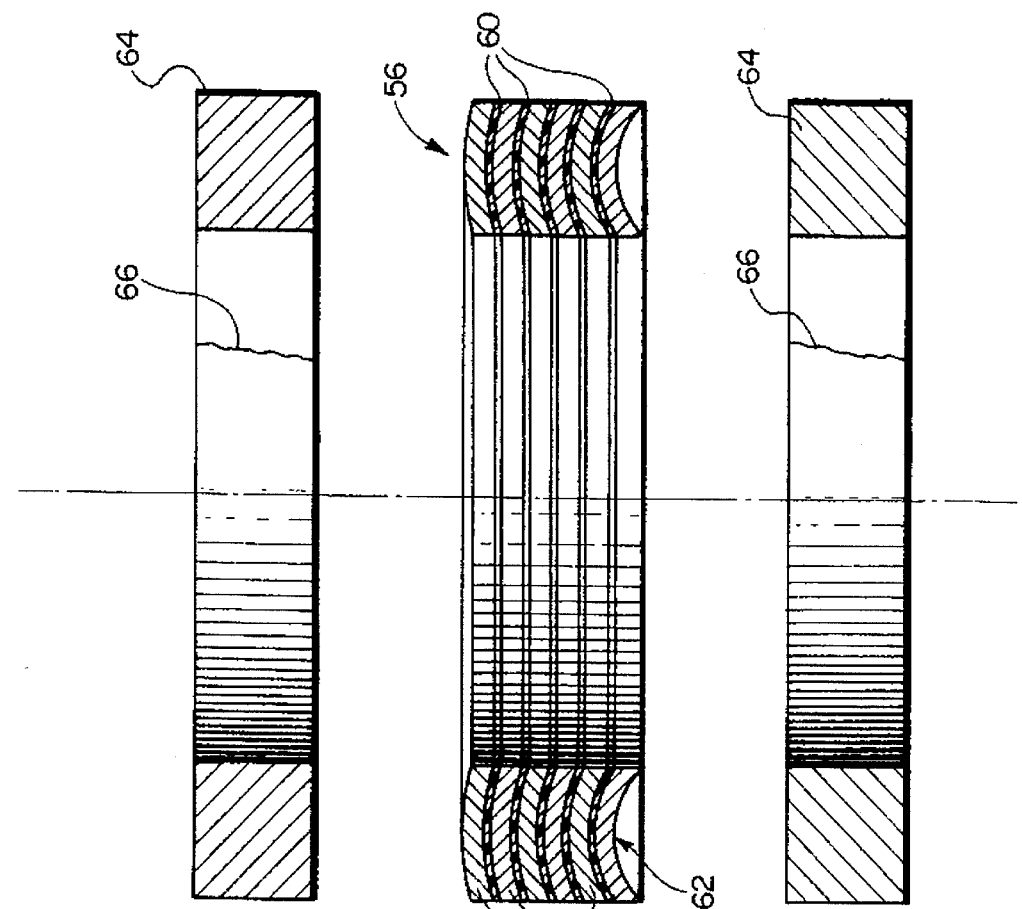
FIG. 4 is an exploded view of the improved packing of FIG. 3.
Figure 3:
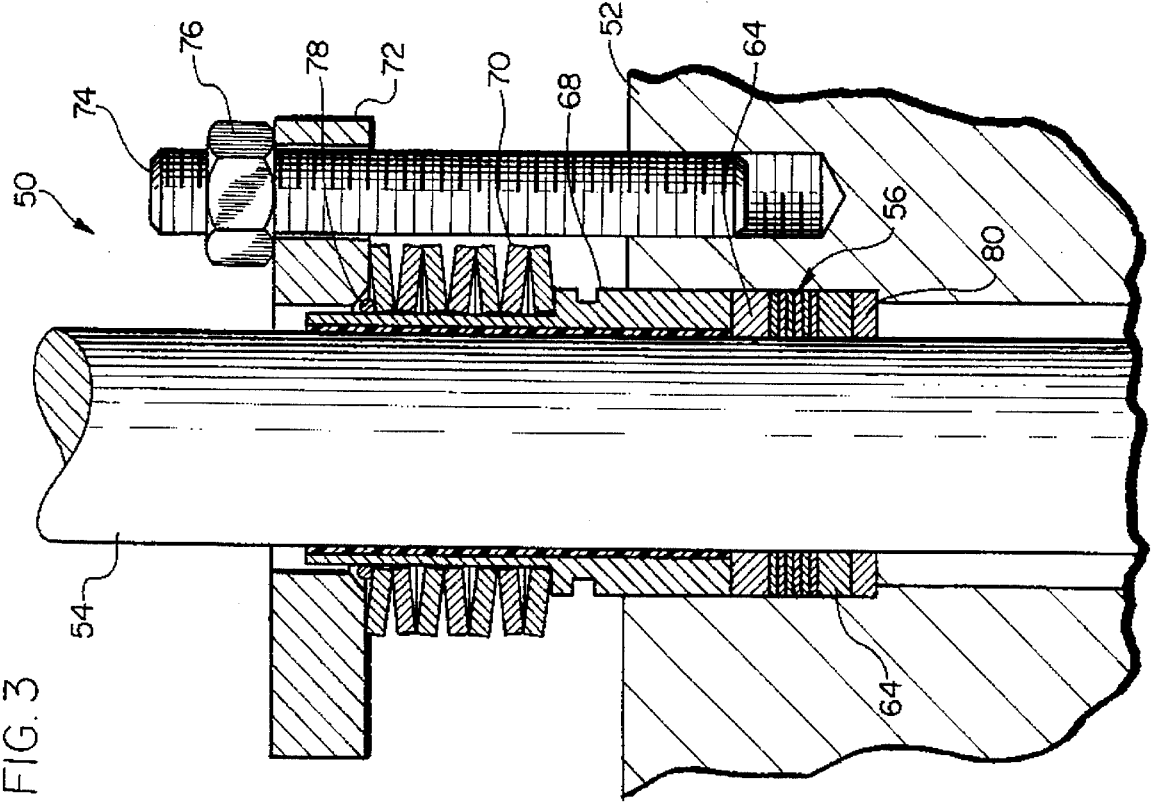
FIG. 3 is a fragmented cross-sectional view illustrating a preferred embodiment of the improved packing of the present invention in a rotating shaft valve.

As indicated previously, the principles of this invention are applicable to sliding stem or rotating shaft valves, as well as reciprocating pump shaft units. FIGS. 1 and 2 illustrate a sliding stem valve incorporating the invention, and FIGS. 3 and 4 illustrate a rotating shaft valve incorporating the invention.

Referring to the drawings, there is illustrated a fluid valve 10 of the sliding stem valve type having a valve body with a valve bonnet 12 through which extends an operating valve member illustrated as sliding stem 14. Packing nuts 16 are threadably mounted on packing studs 18 so as to adjust the loading on the packing within the bonnet and around the valve stem.

Within a packing box formed of a packing bore 20 in valve bonnet 12, there is provided improved graphite packing with PTFE discs as will be described in more detail hereinafter. The improved packing includes a pair of flexible graphite rings 22 which are conventional packing rings of die formed ribbon flexible graphite. The flexible graphite rings 22 are relatively soft material each of which readily acts to seal the valve stem.

On each opposite side of the flexible graphite rings 22, there is provided a graphite composite packing end ring 24. As illustrated in the drawings, two composite end rings 24 are located at one end or top end of the packing whereas only one composite end ring 24 is located at the bottom or other end of the packing. Each of the graphite composite packing end rings 24 are commonly available items from Argo Packing Company of Oakmont, Pa. and are manufactured in accordance with the aforementioned Union Carbide Corporation patent, U.S. Pat. No. 4,826,181.

Composite rings 24 are formed of somewhat harder material than flexible graphite rings 22 so as to act as anti-extrusion members to help prevent transfer of the somewhat softer flexible graphite material on stem 14. Since the composite rings 24 are slightly harder than flexible graphite rings 22, rings 24 tend to wipe the sliding stem valve 14 during operation thereof so as to aid in the prevention of transfer of flexible graphite material to the stem.

A conventional carbon bushing 26 is located at each opposite end of the packing. Since carbon bushings 26 are somewhat harder than composite end rings 24, they act as anti-extrusion rings and also aid in maintaining valve stem 14 centered in the packing box to prevent deformation and destruction of the softer packing material in composite rings 24 and flexible graphite rings 22. A somewhat larger carbon bushing spacer ring 28 is mounted at one end of the packing indicated at the bottom end illustrated in the drawings adjacent packing box end ring 29 so as to take up the rest of the space within the packing box and to provide support for the sliding stem 14.

A plurality of PTFE discs, each about 0.015 inch (0.381 mm) are provided. In the preferred embodiment of the invention five PTFE discs are used. As illustrated, a respective PTFE disc 30 is inserted between each of the packing rings 22 and between graphite composite packing rings 24 and bushing 26 at the top of the packing system. The PTFE discs are intended to partially extrude inward against the stem 14 so that the PTFE material will lubricate the sliding of the stem through the packing. Thus the PTFE discs serve as a lubricant in the packing system as well as a sealing member to aid the graphite packing rings in their sealing function.

A live load packing system is provided so that the packing members are maintained at a stress level that is high enough to readily cause the PTFE discs to extrude. The live load packing includes a packing follower 32 having a follower base 34 at one end, a follower guide sleeve 36 at the other end, and a follower flange 38 therebetween. Follower 32 includes a liner 40 formed of carbon filled PTFE or other suitable material which may be bonded to the inside surface of the packing follower as disclosed in a co-pending application, Ser. No. 07/594,843 assigned to the same assignee as herein.

A series of Belleville disc springs 42 is slidably mounted on follower guide sleeve 36 with one end of the disc springs in contact with flange 38.

Packing flange 44 has suitable apertures through which the packing studs may be passed and includes a central aperture 46 to allow passage of valve stem 14. One end of Belleville disc springs 42 lies in contact with packing flange 44.

After assembly of the valve components as shown in the drawings, the packing nuts 16 on studs 18 surrounding valve stem 14 are tightened so that packing flange 44 transmits the packing stud and nut load to the Belleville disc springs 42. The Belleville springs 42 in turn become compressed with continued tightening of nuts 16 as shown in FIG. 1 so as to maintain a spring load on packing rings 22, 24, 26, 28 and 30 through packing follower 32. If desired, an O-ring (not shown) may be used on follower guide sleeve 36 to maintain the Belleville disc springs in position prior to assembly on stem 14.

The embodiments of the invention shown in the drawings and as described herein provided a significant reduction in fluid leakage as is referred to previously in the described leak rate tests. Thus, in accordance with the principles of the present invention, the improved packing system of illustrated valve 10 reduces fluid leakage to virtually zero so that the valve of this invention can meet the most stringent fluid leakage requirements presently in existence.

The use of PTFE discs 30 provide the desired significant sealing and lubricating qualities of PTFE material and yet because the discs are of a small volume percentage with respect to the total packing volume, catastrophic failures under high temperature fire conditions is avoided. The present invention therefore provides the desired use of PTFE material in an improved packing without incurring the usual detrimental effects of PTFE material at higher operating temperatures. It is understood that in accordance with standard valve practice, zinc discs can be utilized in the packing as sacrificial material to minimize stem corrosion.

Reference may now be made to the drawings of FIGS. 3 and 4 wherein there is illustrated a fluid valve 50 of the rotating shaft valve type containing valve components similar to those shown with respect to the sliding stem valve of FIGS. 1 and 2. In particular, the valve body includes a valve bonnet 52 through which rotates an operating valve member illustrated as rotating shaft 54.

Within a packing box formed of a packing bore in valve bonnet 52, there is provided improved graphite packing which includes a laminated ring 56. Reference may be made to FIG. 4 wherein the components of the ring 56 can be seen more clearly as comprising flexible graphite rings 58 of sheet material laminated with PTFE rings 60 of PTFE sheet material. As illustrated in the exploded view of FIG. 4, six sheets of flexible graphite material are laminated with five sheets of PTFE material with each respective PTFE ring 60 sandwiched between two flexible graphite rings 58.

Laminated ring 56 is preferably formed in a die forming operation wherein the alternating flexible graphite and PTFE sheets are suitably bonded with heat and pressure in a standard laminating operation and die formed in order to die cut ring 56 in the illustrated crown shaped cross-section. As can be seen from FIG. 4, lowermost flexible graphite ring 58 is formed with a cross-sectional crown radius 62. The crown radius decreases in the upper layers of the ring so that the top most layer is substantially flat or has a very slight crown radius compared to the lowermost ring crown radius. It is preferred to form ring 56 with the crown shaped cross-section so as to enable axial loading of the packing to flatten the packing ring and allow it to exert a radial force on shaft 54 and on the packing box bore.

Each of the PTFE thin disc rings 60 are formed of 0.005 inch (0.127 mm) thick PTFE sheet material. Each of the flexible graphite rings 58 are formed of 0.030 inch (0.762 mm) thick flexible graphite sheet material. The PTFE disc rings are intended to controllably, partially extrude inward against shaft 54 so that the PTFE material will lubricate the shaft as it rotates through the packing. Thus the PTFE disc rings serve as a lubricant in the packing system as well as a sealing member to aid the flexible graphite rings in their sealing function.

On each side of laminated ring 56 there is provided a carbon bushing 64 which act as anti-extrusion rings and also aid in maintaining rotary shaft 54 centered in the packing box. Carbon rings 64 are of the zero clearance anti-extrusion type referred to in co-pending application Ser. No. 07/596, 225, assigned to the same assignee as herein. In particular, carbon bushings 64 are split and formed with an inner diameter slightly less than the diameter of rotating shaft 54 and an outer diameter slightly less than the packing bore. Bushings 64 are split with a single fracture 66 which enables the bushings to be inserted onto the operating member with a zero clearance or interference fit while still permitting axial movement on the operating member and thereby transmitting gland loading to the packing.

As in the sliding stem valve embodiment, in rotating shaft valve 50, a live load packing system is provided so that the packing members are maintained at a stress level that is high enough to readily cause the PTFE disc rings to controllably extrude. The live load packing includes a packing follower 68 which includes a liner formed of carbon filled PTFE which may be bonded to the inside surface of the packing follower. A series of Belleville disc springs 70 is slidably mounted on the follower guide sleeve with one end of the disc springs in contact with a packing follower flange as noted in FIG. 3. Packing flange 72 has suitable apertures through which the packing studs, such as packing stud 74, may be passed. Packing flange 72 further includes a central aperture to allow passage of rotating shaft 54. One end of the Belleville disc springs lies in contact with packing flange 72.

After assembly of the valve components as shown in FIGS. 3 and 4, packing nuts 76 are tightened on studs 74 so that packing flange 72 transmits the packing stud and nut load to the Belleville disc springs 70. The Belleville springs in turn become compressed with continued tightening of the nuts so as to maintain a spring load on packing rings 56 and 64 through packing follower 68. O-ring 78 is provided on the follower guide sleeve so as to maintain the Belleville disc springs in position prior to assembly on shaft 54. A conventional metal packing box ring 80 is mounted within the packing bore to form the bottom of the packing box.

As alternative embodiments, PEEK rings can be used in place of the carbon rings 64. Also, graphite composite end rings such as rings 24 described previously may be used between the laminated ring 56 and the upper and lower rings 64. The same laminated ring 56 configuration could also be used without the crown shape cross-section by controlling the fit of ring 56 with shaft 54 and with the packing box bore. However, in order to achieve the same radial force sufficient to desirably partially extrude the PTFE material inwardly against the shaft and outwardly against the packing bore, the axial load required from the packing follower in order to achieve this desired result may be greater than is required with the crown shaped cross-section configuration of ring 56. Also, bushings 26 shown in FIG. 1 may be formed with a high compressive strength linear aromatic polymer such as polyetheretherketone (PEEK).

The foregoing detailed description has been given for clearness of understanding only, and no unnecessary limitations should be understood therefrom, as modifications will be obvious to those skilled in the art.

What is claimed is:

1. A packing system for reliably sealing and lubricating an operating member operably movable in a housing containing fluid comprising:

a packing box within said housing;

packing follower mounting means for supporting said operating member in said packing box;

a packing assembly including a packing ring mounted around said operating member in said packing box for providing a fluid seal around the operating member to restrict fluid leakage from said packing box and for providing a lubricant for said operably movable operating member;

said packing ring formed of a plurality of spacially separated sheets of flexible graphite sheet material each flexible graphite sheet laminated with a respective intermediate sheet of PTFE sheet material to provide a laminated ring of alternating sheets of flexible graphite sheet material and PTFE sheet material disposed transverse to said operating member, said laminated ring having a central aperture with an inner diameter adapted to surround said operating member and having an outer ring diameter;

each of said sheets of flexible graphite sheet material having oppositely disposed graphite ring surfaces extending radially outwardly from said central aperture inner diameter to said outer ring diameter for sealing fluids around said operating member; and at least one sheet of PTFE sheet material extending radially outwardly from said central aperture inner diameter to said outer ring diameter and in laminated engagement with the full extent of the oppositely disposed graphite ring surfaces of two consecutive sheets of flexible graphite and thereby preventing surface contact between the opposing graphite ring surfaces of the two consecutive sheets of flexible graphite; and adjustable loading means loading said packing assembly for enabling said PTFE to partially extrude and flow radially under loading for lubricating said operating member and aiding in sealing fluids around said operating member.

2. A packing system according to claim 1, including means for bonding said alternating sheets of flexible graphite sheet material and PTFE sheet material.

3. A packing system according to claim 1, wherein said laminated ring has a perimeter portion and includes a crown shaped cross section around said perimeter portion.

4. In a fluid valve, a packing system for reliably sealing and lubricating a valve operating member operably movable in said fluid valve, comprising:

a packing box within said valve;

packing follower mounting means for supporting said valve operating member in said packing box;

a packing assembly including a packing ring mounted around said operating member in said packing box for providing a fluid seal around the valve operating member to restrict fluid leakage from said packing box and for providing a lubricant for said operably movable valve operating member;

said packing ring formed of a plurality of spacially separated sheets of flexible graphite sheet material each flexible graphite sheet laminated with a respective intermediate sheet of PTFE sheet material to provide a laminated ring of alternating sheets of flexible graphite sheet material and PTFE sheet material disposed transverse to said valve operating member, said laminated ring having a central aperture with an inner diameter adapted to surround said valve operating member and having an outer ring diameter;

each of said sheets of flexible graphite sheet material having oppositely disposed graphite ring surfaces extending radially outwardly from said central aperture inner diameter to said outer ring diameter for sealing fluids around said valve operating member; and at least one sheet of PTFE sheet material extending radially outwardly from said central aperture inner diameter to said outer ring diameter and in laminated engagement with the full extent of the oppositely disposed graphite ring surfaces of two consecutive sheets of flexible graphite and thereby preventing surface contact between the opposing graphite ring surfaces of the two consecutive sheets of flexible graphite; and adjustable loading means loading said packing assembly for enabling said PTFE to partially extrude and flow radially under loading for lubricating said valve operating member and aiding in sealing fluids around said valve operating member.

5. In a fluid valve, a packing system according to claim 4, including means for bonding said alternating sheets of flexible graphite sheet material and PTFE sheet material.

6. In a fluid valve, a packing system according to claim 4, wherein said laminated ring has a perimeter portion and includes a crown shaped section around said perimeter portion.

* * * * *